UNITED STATES PATENT OFFICE.

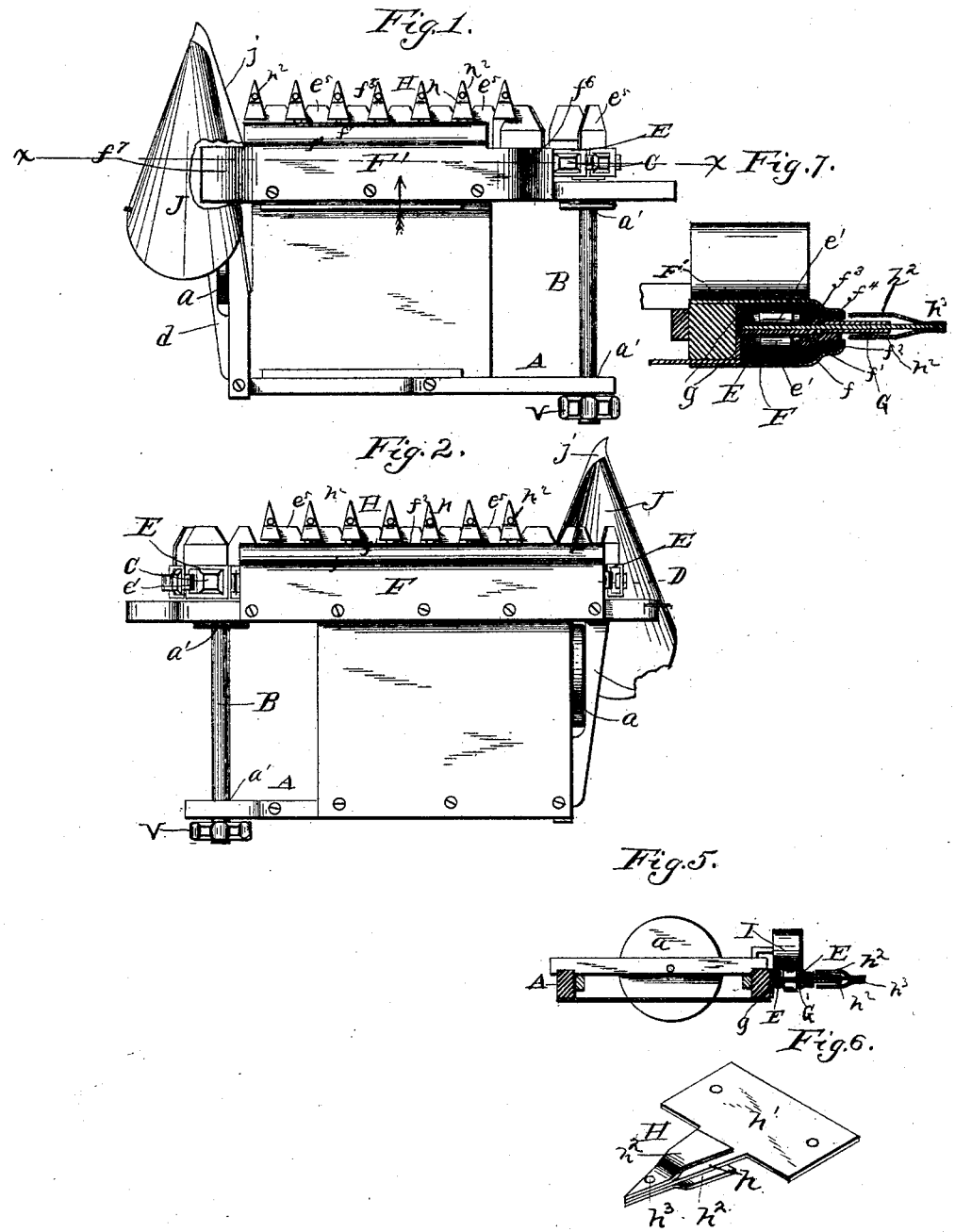

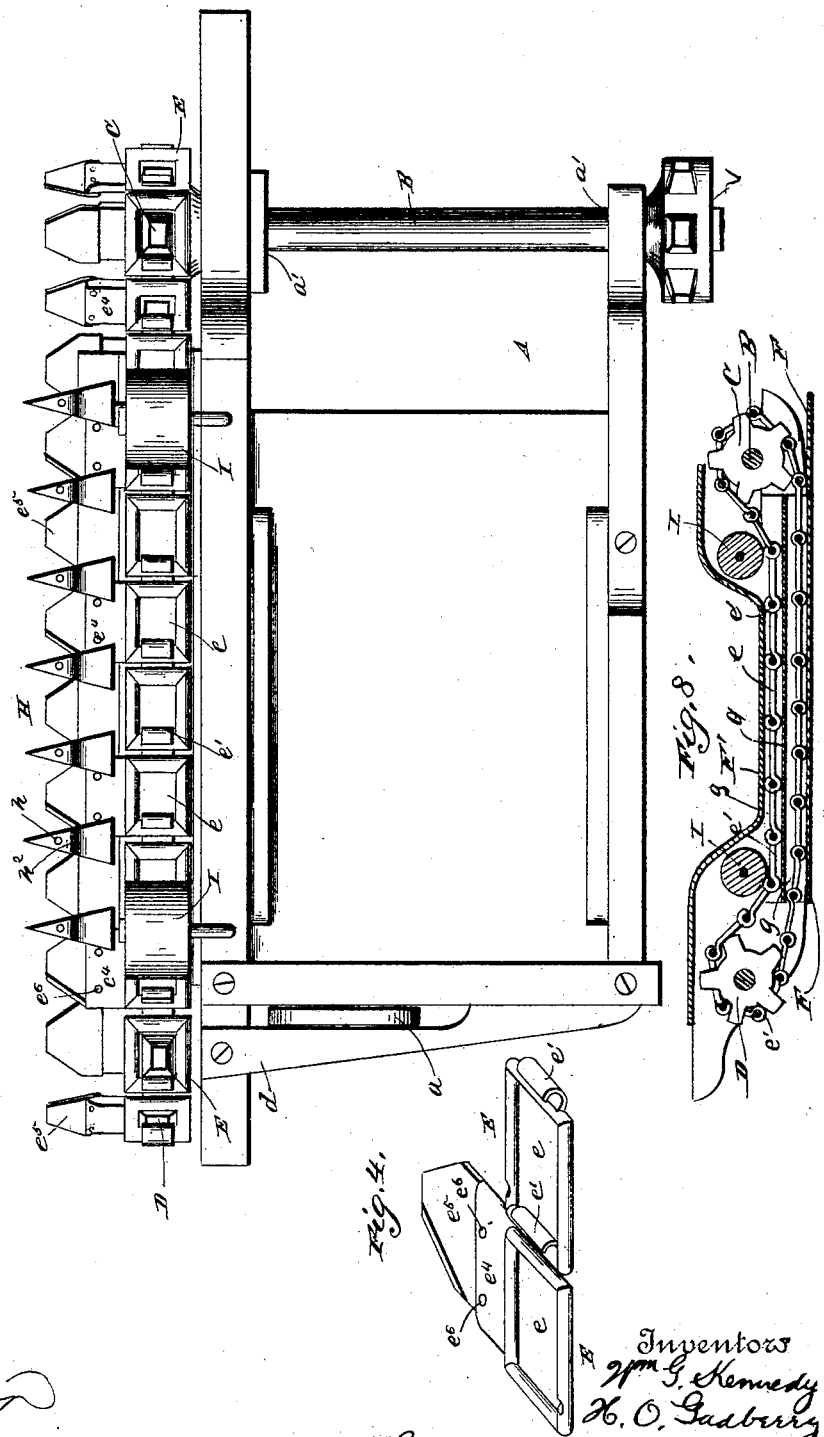

WILLIAM GRIMES KENNEDY AND HARVEY OSBORNE GADBERRY, OF CAWKER CITY, KANSAS.

HARVESTER.

SPECIFICATION forming part of Letters Patent No. 362,093, dated May 3, 1887.

Application filed July 31, 1886. Serial No. 209,680. (No model.)

*To all whom it may concern:*

Be it known that we, WILLIAM GRIMES KENNEDY and HARVEY OSBORNE GADBERRY, citizens of the United States, residing at Cawker City, in the county of Mitchell and State of Kansas, have invented a new and useful Improvement in Harvesters, of which the following is a specification.

Our invention relates to improvements in cutting apparatus for harvesting-machines; and it consists of the peculiar combination of devices and novel construction and arrangement of parts, substantially as hereinafter fully described, and particularly pointed out in the claims.

The object of our invention is to provide an improved cutting apparatus for harvesters which shall be capable of easy and noiseless operation and be free from the jerky movement incident to reciprocating cutters.

In order that our invention may be fully understood we will proceed to describe it with reference to the accompanying drawings, in which—

Figure 1 is a plan view of the platform of a harvester with our improvements applied. Fig. 2 is an inverted plan view of the same. Fig. 3 is a plan view, on an enlarged scale, of a part of the platform, with the upper part of the double shield and the grain-wheel guard removed. Fig. 4 is an enlarged perspective view of a portion of the endless sprocket-chain. Fig. 5 is a transverse vertical sectional view through the cutting apparatus of our invention and the platform. Fig. 6 is a detached perspective view of one of the guard-fingers, on an enlarged scale, and Fig. 7 is an enlarged vertical transverse sectional view through the cutting apparatus. Fig. 8 is a vertical longitudinal sectional view through the shields of the cutting apparatus on the line $x\,x$ of Fig. 1.

In the said drawings, A designates the grain-platform of a harvesting-machine, said platform being of the usual or any preferred construction and supported on its outer or grain side by the usual grain wheel, $a$. At its inner end the platform carries an operating-shaft, B, extending transversely of the platform and having bearings in the front and rear frame-pieces, $a'$, thereof, as shown. At its rear end the shaft B carries a sprocket-pinion, V, over which runs the usual drive-chain leading from the bull-wheel connections, as at present arranged; or said wheel may be driven by any suitable or preferred form of gearing, so as to turn the shaft B. At its forward end the shaft B carries a sprocket-wheel, C, as shown. Upon the outer side of the grain end of the platform is secured a bracket-arm, $d$, upon the forward end of which is mounted the sprocket-wheel D in such manner as to turn freely upon said bracket.

E designates an endless drive-chain, which runs over the sprocket-wheels C D, as shown. This chain is composed of a series of open rectangular links, $e$, having each at one end a wide hook, $e'$, which latter embraces the plain end of the open rectangular link $e$ next to it. The outer side of each link $e$ is formed with a flat extension, $e^4$, to the under side of which is attached a cutter-blade, $e^5$, of the usual or any preferred form. These blades may be either formed integrally with the extensions $e^4$ or welded thereto, or secured thereto by pins $e^6$, as shown.

In order that the arrangement of the several parts may be more clearly shown, in Fig. 3 we have shown the alternate links $e$ as being without the extension $e^4$ and cutter $e^5$. In practice we intend to provide each link with the extension and cutter, though it may sometimes be found desirable to provide the alternate open links, as will be readily understood.

Upon the under part of the front side of platform A is secured the lower section, F, of a double shield, F F', said section extending the full length of the platform and having its outer edge bent upward, then outward, and then upward again, as shown, respectively, at $f\,f'\,f^2$. The upper section, F', is similarly secured to the upper side of the platform A and its outer edge is bent downward, then outward, and then again downward, as shown, respectively, at $f^3\,f^4\,f^5$. By virtue of the peculiar form of the outer edges of these shield-sections the drive-chain E is completely inclosed and protected, only the blades $e^5$ being permitted to protrude from the shield. The ends $f^6\,f^7$ of the shield-section F' are bent upward and outward, so as to extend partially over the sprocket-wheels C D, as shown.

G designates the finger-bar, which has a double flange, $g$, at its rear edge, by means of which flange said bar is secured to the front side of the platform A in such manner as to extend forward midway of the space inclosed by the shield-sections F F'. Upon the outer edge of the finger-bar G are secured the guard-fingers H, each of which consists of a triangular finger, $h$, having an oblong rectangular base, $h'$, said base being provided with holes to receive the bolts which secure the finger to the finger-bar. Each of these fingers carries two guards, $h^2$, one of which is arranged on the upper and the other on the lower side of the finger, the guards being secured or affixed in their proper positions to the finger by a rivet, $h^3$, or other preferable means.

As shown in Figs. 3 and 5, the drive-chain is guided in and out beneath the upper shield-section, F', by pulleys I, which are mounted at opposite ends of the platform A and press upon the upper side of said chain.

J designates the grain-wheel guard or fender, which is provided with a re-enforce piece, $j$, and both of these parts are in turn secured to the grain end of the platform, as shown, the fender J, by completely enveloping the sprocket-wheel D, serving to protect the same from injury.

The operation of our invention will be very readily understood from the foregoing description taken in connection with the drawings. The shaft B is rotated by connections from the bull or master wheel of the harvesting-machine and causes the endless sprocket-chain to move over the sprocket-wheels by which it is supported. The cutters on the upper part of the endless sprocket-chain move in one direction and the cutters on the lower side of the said chain move in the opposite direction, thereby acting upon the grain from opposite sides and effectually cutting down the same.

Having thus described our invention, what we claim as new, and desire to secure by Letters Patent, is—

1. In a cutting apparatus for harvesting-machines, the combination, with a grain-platform, and sprocket-wheels suitably journaled on the platform, of a finger-bar affixed to the platform and having the forwardly-projecting fingers provided with the fixed guards $h^2$ on their upper and lower sides, and an endless sprocket-chain passing over the sprocket-wheels and above and below the finger-bar, each link of the sprocket-chain being flexibly connected to an adjoining link of said chain and having a forward-projecting cutter which is adapted to pass through the space between the fingers and the guards thereof, as and for the purpose described.

2. A guard-finger for the cutting apparatus of a harvesting-machine, having the upper and lower guards $h^2$ rigidly connected thereto, substantially as described.

3. In a cutting apparatus for harvesting-machines, the combination, with a grain-platform, and the sprocket-wheels suitably journaled at the ends of the platform, of an endless chain passing over the said sprocket-wheels and having the fixed cutters or blades, the upper and lower shields inclosing the said chain rigidly affixed to the grain-platform and having their outer edges terminating out of contact with each other to leave an intermediate space through which the cutters or blades extend, and the finger-bar arranged between the upper and lower sides of the sprocket-wheel and affixed to the platform, said bar having the fingers provided with the fixed guards $h^2$, as set forth.

In testimony that we claim the foregoing as our own we have hereto affixed our signatures in presence of two witnesses.

WILLIAM GRIMES KENNEDY.
HARVEY OSBORNE GADBERRY.

Witnesses:
G. M. SMITH,
F. J. KEMPEL.